Sept. 3, 1940.  H. H. BRIGGS  2,213,484
APPARATUS FOR VISUAL TRAINING
Filed July 22, 1939   3 Sheets-Sheet 1
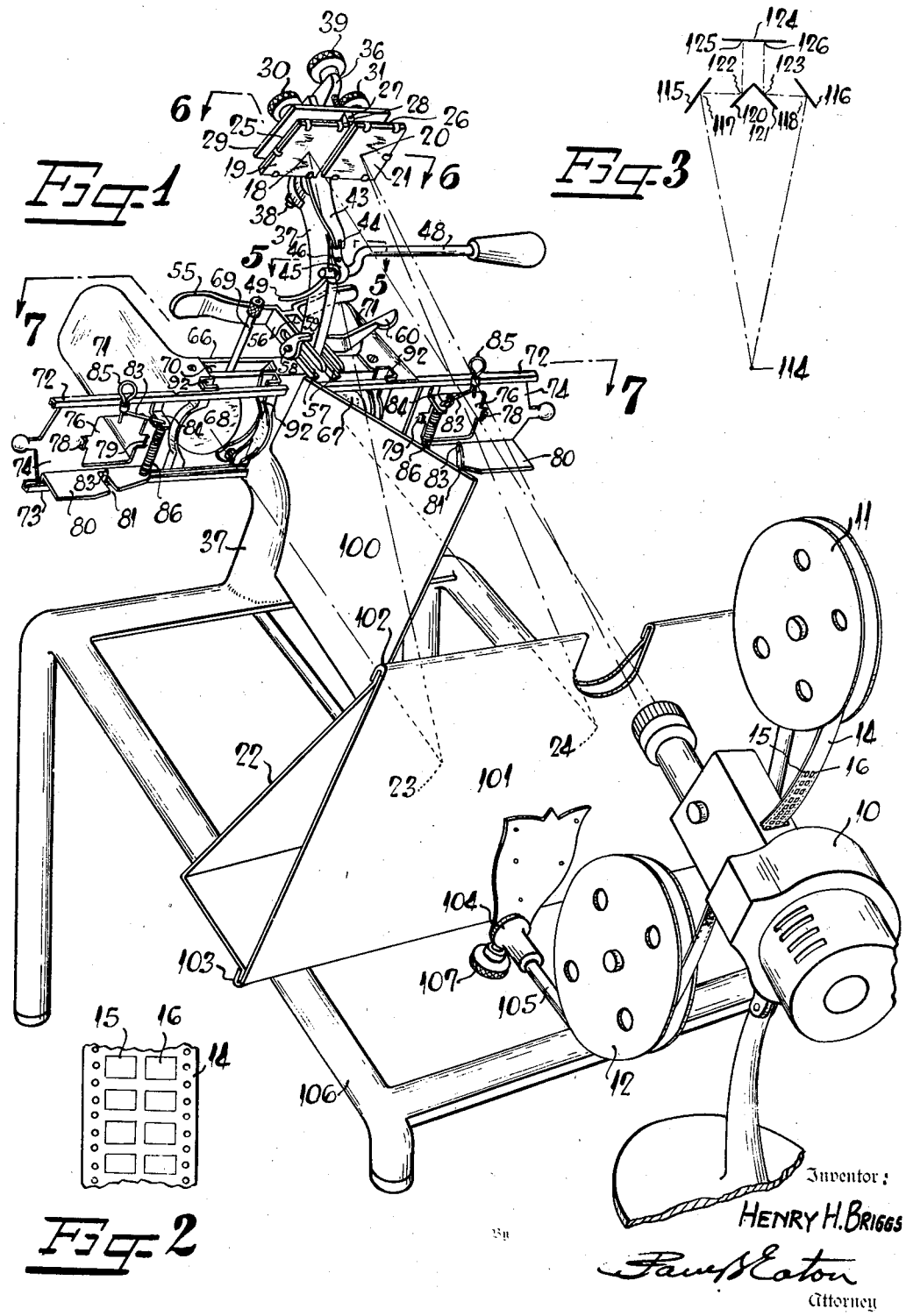
Inventor:
HENRY H. BRIGGS
Paul H. Eaton
Attorney Sept. 3, 1940.  H. H. BRIGGS  2,213,484
APPARATUS FOR VISUAL TRAINING
Filed July 22, 1939  3 Sheets-Sheet 2
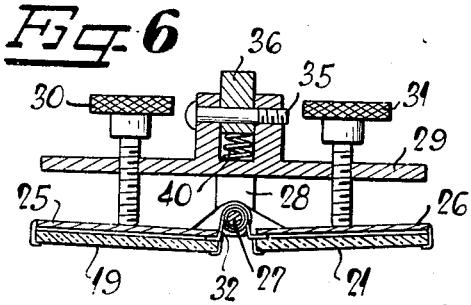
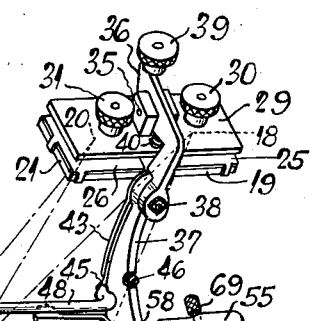
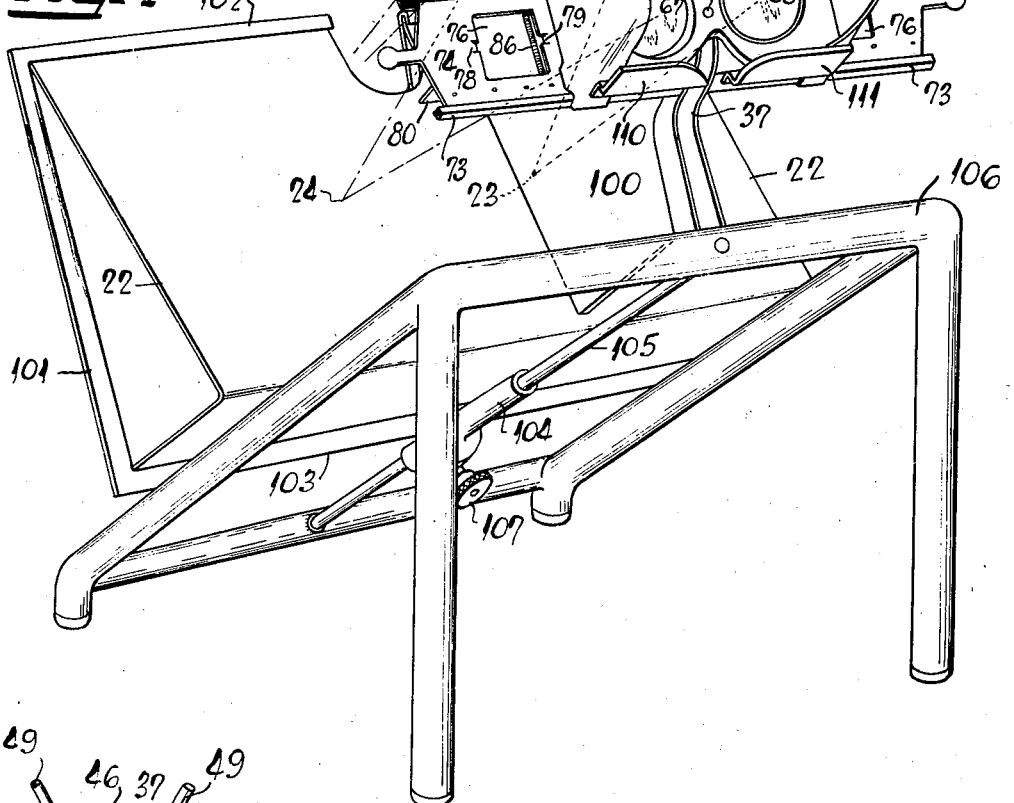
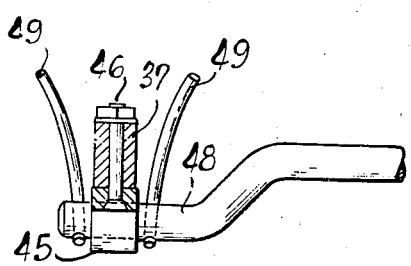
Inventor:
HENRY H. BRIGGS
By
Attorney

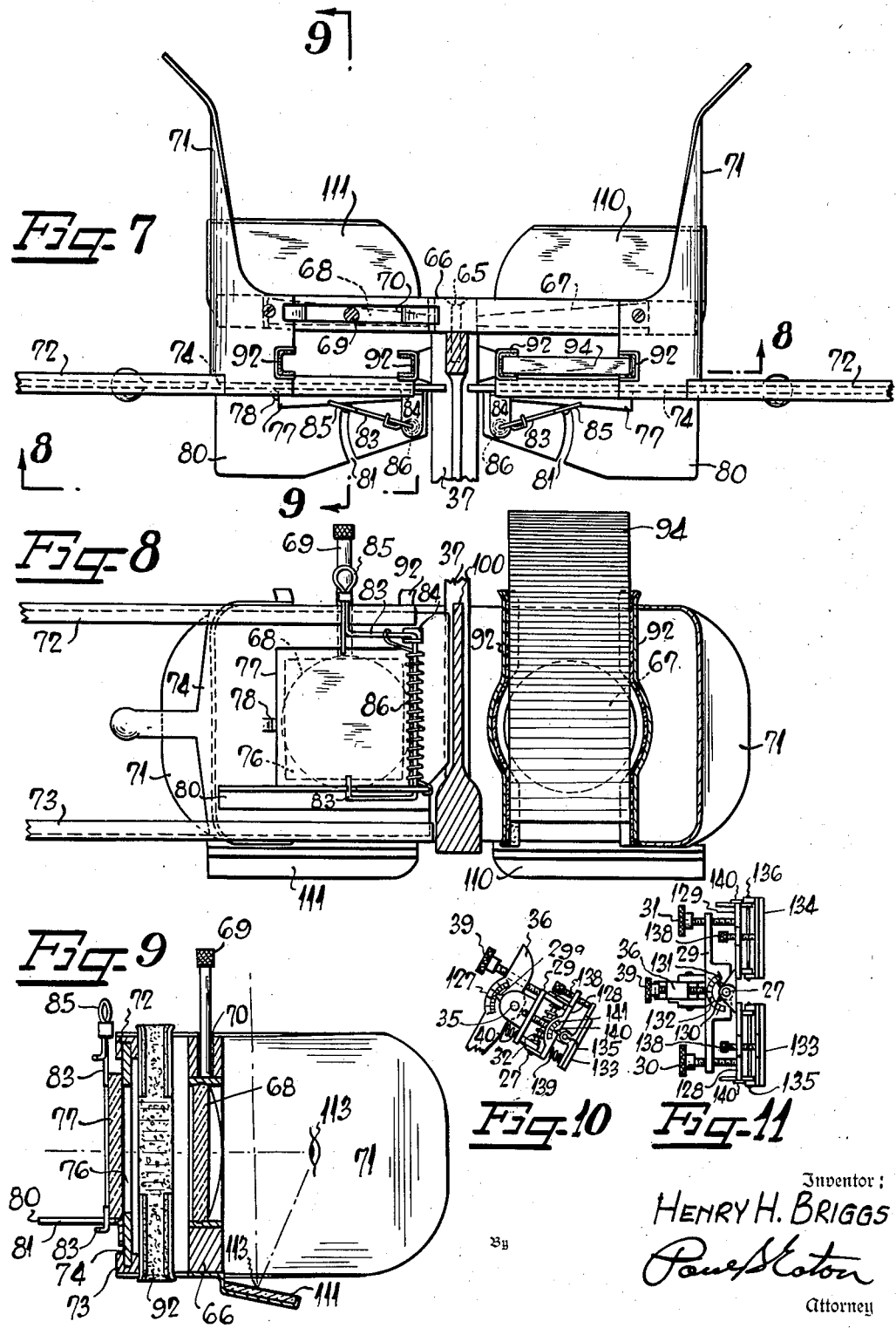

Patented Sept. 3, 1940

2,213,484

UNITED STATES PATENT OFFICE 2,213,484

APPARATUS FOR VISUAL TRAINING

Henry H. Briggs, Asheville, N. C.

Application July 22, 1939, Serial No. 285,989

2 Claims. (Cl. 128—76.5)

This invention relates to an apparatus for visual training and more especially to a compact instrument which will assist patients in obtaining fusion sense, stero sense, to stimulate the visual sense of eyes of a subnormal vision, to stimulate single binocular vision, and to correct neuromuscular anomalies. In other words, this instrument is designed for general ortho-optic training. In addition to the above, this instrument has incorporated therein facilities which will assist the eye specialist in the diagnosis of orthoptic and neuromuscular anomalies and diagnosis of the visual field.

It is an object of this invention to produce stereoscopic motion pictures in pairs, the images of which are projected upon a screen so that the right image is seen by the right eye only and the left image is seen by the left eye only, thereby stimulating the duction of the eye muscles and stimulating the sense of fusion and depth perception. The invention, in part, comprises a conventional moving picture projector and a screen onto which pairs of moving images are simultaneously projected for observation by the patient. A reflecting mechanism is disposed between the projector and the screen for independently controlling the relative position of each image on the screen and also for simultaneously shifting the position of both images on the screen without disturbing their relation to each other.

It is another object of this invention to provide a reflecting mechanism which is adapted to operate with a combination of instruments as above described, including means for varying the limits within which the position of spaced images may be shifted on the screen. Sometimes, even when the spaced images are positioned the proper distance apart, the patient is unable to fuse these objects into one. It is often necessary to move these objects laterally, back and forth across the screen, without disturbing their relative positions to thereby create the desire for immediate fusion and muscle coordination.

It is a further object of this invention to provide a diagnostic instrument comprising an inclined framework with lens therein through which a patient views stereoscopic or double images on a suitable screen from a natural position, said framework having angularly disposed mirrors mounted thereon for reflecting images of the patient's eyes to a point where they can be observed by a specialist as the patient views the images on the screen. Mirrors are so positioned on the framework that the light reflected from the screen onto the eye enables the specialist to view relative eye positions simultaneously without the aid of any other light source.

It is a still further object of this invention to provide an apparatus comprising a screen and a framework for supporting a pair of lens at a higher elevation than the screen and through which a person views the screen, said lens being adapted to operate in conjunction with a filter whereby the light from one image may be reduced creating a difference in light stimulation to the two eyes. The filter used with the lens uniformly gradated from one end to the other with the opaqueness gradually diminishing. The position that the gradated slide or filter occupies relative to the lens determines the amount of light stimulation or visual acuity of the eye.

Some of the objects of the invention having been stated, other objects will appear as the description proceeds when taken in connection with the accompanying drawings, in which—

Figure 1 is an isometric view of the invention;

Figure 2 is a view showing a portion of film used in the projector shown in Figure 1;

Figure 3 is a schematic view showing the method employed in the production of the film;

Figure 4 is an isometric view looking at the opposite side of the invention from that shown in Figure 1;

Figure 5 is a sectional plan detail view taken along the line 5—5 in Figure 1, showing the mechanism for varying the limits within which the position of spaced images on the screen may be varied;

Figure 6 is a sectional detail view taken along the line 6—6 in Figure 1;

Figure 7 is a sectional plan view taken along the line 7—7 in Figure 1;

Figure 8 is a sectional view taken along the line 8—8 in Figure 7;

Figure 9 is a vertical sectional view taken along the line 9—9 in Figure 7;

Figure 10 is a side elevation of a slightly modified form of reflecting mechanism which has means incorporated therein for independently adjusting the mirrors about their horizontal axes.

Figure 11 is a top plan view of Figure 10.

Referring more specifically to the drawings, the numeral 10 denotes a conventional projector having reels 11 and 12. A suitable stereoscopic film 14 is adapted to unwind from reel 11 and pass through projector 10 and onto reel 12. Figure 2 shows an enlarged view of the stereoscopic film 14, and it is here seen that images 15 and 16 are produced on this film. Usually the image 15 is taken at a slightly different angle from the image 16 thereby producing a stereoscopic effect when viewed through the apparatus which will hereinafter be described.

When the projector 10 is in operation and the film 14 is passing therethrough, the image 16 will be projected as at 18 upon a mirror 19; whereas the image 15 will be projected as at 20 upon mirror 21. These mirrors are set at such an angle that the images will be reflected upon an inclined screen 22 as at 23 and 24. It will be noted that the screen 22 is inclined so that its surface is substantially parallel to the surfaces of the mirrors 19 and 21 so that the reflected images on the screen will not be distorted.

The mirrors 19 and 21 are secured to one side of metallic plates 25 and 26, respectively (Figures 1, 4 and 6), said plates being hinged upon a common bolt or pivot 27 which, in turn, is mounted in lugs 28 extending from one side of a fixed plate 29. The plate 29 has adjustment screws 30 and 31 threadably secured therein and the ends of these screws are adapted to contact the back sides of plates 25 and 26 respectively. Disposed around the bolt 27 is a torsion spring 32 which normally tends to rotate the plates 25 and 26 so that the back sides thereof press against the projecting ends of screws 30 and 31, respectively. Therefore, by manipulating the thumb screws 30 and 31, the horizontal adjustment of the mirrors 19 and 21 about bolt 27 can be effected.

The plate 29 is pivotally secured as at 35 to an upwardly projecting bracket 36 which has its lower end pivoted to post 37 as at 38. The extreme upper end of the bracket 36 has an adjustable screw 39 threadably secured therein with its threaded end normally contacting the upper edge of plate 29. The lower edge of the plate 29 has one end of a compression spring 40 abutting thereagainst (Figures 4 and 6) which spring normally holds the upper side of the plate 29 against the end of the thumb screw 39. By manipulating this screw 39 it is possible to vary the angularity of both mirrors 19 and 21 simultaneously about pivot 35, so that the position of points 23 and 24 on the screen 22 can be varied vertically. The pivot or bolt 38 is fixedly secured in the support 36 but is rotatably secured in the upper end of post 37 (Figures 1 and 4). The upper end of bolt 38 has a lever arm 43 fixedly secured thereon, the lower end of which is forked to accommodate a pin 44. This pin is mounted in the upper end of a lever 45, said lever being pivoted as at 46 intermediate its ends to the post 37. The lower end of the lever 45 has rotatably mounted therein one end of horizontally disposed handle 48 (see Figure 5) and disposed on each side of the lever 45 and penetrating the handle 48 is an arcuate prong 49. These arcuate members diverge away from each other on opposed sides of the post 37. Since the handle 48 is rotatably mounted in the lower end of lever 45, it is evident by turning the handle in the lever 45 that the position of the diverging ends of prongs 49 can be raised or lowered. When the free ends of the prongs are raised the clearance between the prongs and the post 39 is at a minimum and consequently only a slight amount of rotation of lever 45 about pivot 46 can be effected. For example, if the top side of handle 48 is rotated away from the observer in Figures 1 and 5, the free ends of prongs 49 will be moved downwardly thereby allowing the handle 48 and lever 45 to rotate through a greater angle about pivot 46 before one of the prongs 49 engages the post 37; whereas if the handle 48 is rotated in the opposite direction, the amount of rotation about the pivot point 46 will be lessened accordingly. The angle through which lever 45 and arm 43 is rotated about pivot point 46 determines the angle through which the mirrors 19 and 21 are rotated about their pivot 38.

Secured to the post 37 directly below the handle 48 is a head rest 55. This head rest is used as a guide for positioning the head of a patient relative to the lenses in the framework therebelow. It will be noted that the head rest 55 has a pair of prongs 56 integral therewith, said prongs being positioned on opposed sides of the post 37. Suitable slots 57 are cut in these prongs, which slots are penetrated by a bolt 58 which bolt also penetrates the support or post 37. The bolt 58 has a nut 59 on one end and a handle 60 on the other, so that when the handle 60 is rotated the nut 49 can be loosened to allow the head rest 55 to be adjusted.

Secured to the post 37 as at 65 is a lens holder or framework 66. One side of this frame has a stationary prismatic lens 67 mounted therein and the other side has a rotatable prismatic lens 68 mounted therein, the lens 68 having a handle 69 integral therewith which extends upwardly through a slot 70 in the framework. The slot 70 is of sufficient length to allow the handle 69 and lens 68 to be rotated through substantially an angle of 45 degrees thereby varying the position of the lens to conform to the needs of the patient's eye. In the present instance the lens employed is a seven inch, seven degree prism, and is adapted to be mounted in a suitable friction bearing.

Each end of framework has a hood or housing 71. The distance between these hoods is sufficient to admit any spectacles that the patient may be wearing. These hoods or housings are adapted to support guides 72 and 73 which slidably support prism slides 74. The length of these guides is sufficient to allow the prism slides 74 to be moved to an inoperative position as shown in Figures 1 and 4 where the view through the prisms 67 or 68 will not be obstructed, or if desired, the slides 74 may be moved to the position shown in Figures 7 and 8 at which time the prism disposed in the slides will work in conjunction with the prisms 67 and 68.

Each slide has a squared hole 76 therein and over which suitable prisms 77 are adapted to fit. In order to furnish a guiding means so that these prisms will be properly located relative to the hole 76, projections 78 and 79 have been provided. Also an angle member 80 has been secured to slide 74 at a point adjacent the lower side of hole 79, said angle member having an outstanding leg upon which the lower edge of the prism is adapted to rest.

The outstanding leg of this angle has an arcuate slot 81 cut therein which is penetrated by an upwardly extending end of a wire member 83. By observing Figure 8, it will be seen that the lower end of this wire projects above the outstanding leg of angle member 80 just a sufficient amount to properly engage the lower side of the prism 77 and to hold it against the slide 74. The wire member 83 has its intermediate portion rotatably mounted in the outstanding leg of angle member 80 and also in the outstanding leg of another angle member 84, this angle member 84 being likewise secured to slide 74. The portion of wire 83 above the angle member 84 extends laterally and then upwardly forming a loop 85 and then downwardly having its end pressing against the top of the lens 77.

It is therefore seen that the extremities of the wires 73 are normally held against the exterior of the prisms 77. The means for normally pressing these extremities against the prism comprises a torsion spring 86 which is disposed around the intermediate portion of the wire. One end of the spring is secured to the upper portion of wire 83 and its other end is anchored to the outstanding leg of angle member 80. By providing such an arrangement, the lens is easily held in any position over the hole 76 and it also may be removed very quickly. The purpose of providing the guides 72 and 73 is to permit the bodily movement of the lens and slide 74 to and from operative position.

As heretofore stated, when the patient is viewing an image on the screen through the prisms 67, 68 and 77 it is often necessary to cut down the light stimulation or visual acuity of one eye with relation to the other. In order to effect this purpose, I have employed vertical felt lined guides 92, in association with each of the lenses 67 and 68. Between these guide members a filter glass 94 is inserted which is uniformly gradated with the opaque intensity being at a maximum at one end and gradually decreasing to a minimum at the other end (see Figures 7 and 8). As will be noted in Figure 8 the filter is the densest at the top, the density gradually decreasing from top to bottom. Therefore, the farther that the filter 94 is pushed downwardly between the guides 92 then the greater will be the resistance to the light therethrough. It is not necessary to use this filter in but one set of guides at a time, because the light is diminished over the strongest eye, thus relatively increasing light stimulation to the poorer eye.

With the prisms and filters in operative position, the left eye of a patient is adapted to view the image 24 on the screen 22 through the prism 67, the filter 94 and prism 77; whereas the right eye of the observer will view image 23 through the prism lens 68 and through the lens 77. Since a septum 100 is provided, between lenses, it is evident that the left eye will see the film image 15 as at 24 and the right eye will see the film image 16 as at 23. When the proper set of lenses have been placed in the instrument and adjusted to the proper position, the two images will be superimposed one upon the other thereby fusing them into one object.

Due to the fact that the focal point of the patient's eyes vary from time to time and vary with different patients, a means has been provided whereby the distance which the screen 22 occupies from the lenses may be varied accordingly. This means comprises a screen holder 101 which has upper and lower inturned edges as at 102 and 103. These inturned edges are adapted to slidably confine the edges of the screen 22 therein. When it is desired to remove screen 22, it is only necessary to pull it toward the observer in Figure 1. The intermediate portion of the screen holder 101 has a bracket 103 secured thereto and this bracket is slidably mounted upon a rod 105, said rod being a portion of the framework 106 which also supports post 37. In order to hold the bracket 104 and its associated member 101 in adjusted position, a set screw 107 has been provided.

When it is desired to use this instrument for diagnostic purposes, the screen 22 is removed and a chart is inserted in lieu thereof. The surface of this chart will be substantially parallel to the lenses, what is at right angles to the line of sight of the patient. This arrangement is used for mapping out visual fields for diagnosing pathological conditions. The instrument may be also used as a regular stereoscope to use the usual orthoptic training slides.

It is also desirable, at times, for the physician or eye specialist to observe the eyes of the patient while the patient is viewing the object on the screen 22. For this purpose a pair of mirrors 110 and 111 have been secured to the lower side of the member 66. By observing Figure 9, it is seen that these mirrors are inclined at a slight angle to the line of sight of the patient so that the image of the eye 112 will strike the mirror as at 113. From this point the image will be reflected upwardly. It is therefore seen that the physician may look down into these mirrors and observe the motion of the patient's eyes while the patient is observing the pictures or images upon the screen.

Figure 3 schematically shows the method employed in the production of a pair of images such as 15 and 16 on a film from a single object. The images of an object 114 strike mirrors 115 and 116 as at 117 and 118, respectively. These images are then projected onto mirrors 120 and 121 as at 122 and 123 from whence they are projected onto camera lens 124 as at 125 and 126, respectively.

Figures 10 and 11 show a slightly modified form of reflecting mechanism which has incorporated therein means for independently adjusting the reflecting mirrors about their horizontal axes and also means for indicating the angularity through which the mirrors have been rotated. In this mechanism, the plate 29 is pivoted to bracket 36 as in the preceding form; however, a pointer 29a has been added which is adapted to traverse suitable graduations 127 on the bracket 36. This combination will enable the operator to ascertain the angularity through which the plate 29 has been turned about pivot 35.

Pivotally secured to one side of plate 29 as at 27 are plate members 128 and 129. These plates are similar to plates 25 and 26, previously described, in that the free ends are resiliently held against the ends of screws 30 and 31 by means of a torsion spring 32; however, suitable pointers 130 and 131 are associated with plates 128 and 129 respectively and these pointers traverse graduations 132 on member 29 so as to indicate the angle through which the plates have been rotated.

The plates 128 and 129 have mirrors 133 and 134 pivoted thereto on horizontal shafts 135 and 136, respectively. An adjusting screw 138 is threadably secured in each of plates 128 and 129, the ends of said screws being adapted to contact the upper back side of each of the mirrors 133 and 134. A compression spring 139 is disposed between the plate 128 and mirror 133 at a point below shaft 135. A similar spring is disposed between plate 129 and mirror 134 at a point below shaft 136.

Each of the mirrors 133 and 134 has a pointer 140 associated therewith which traverses graduations 141 to indicate the angle through which mirrors 133 and 134 rotate about their respective shafts 135 and 136. By mounting the mirrors 133 and 134 upon the shafts 135 and 136 in the manner shown an additional independent adjustment is obtained which is not present in the preceding form.

In the drawings and specification, there has been set forth a preferred embodiment of the invention and although specific terms are employed, they are used in a generic and descriptive sense only, and not for purposes of limitation, the scope of the invention being set forth in the appended claims.

I claim:

1. Apparatus for visual training comprising a screen, a pair of lenses through which a patient views the screen, a pair of reflectors for reflecting a pair of images on the screen, means for individually adjusting the position of the reflectors to move the image reflected thereby laterally of the screen, single means for simultaneously adjusting the position of the reflectors to move the image vertically of the screen, a plate supporting the reflectors, a bracket mounted on a vertical pivot for supporting the plate, an arm extending from the bracket, and a lever engaging the arm to move the bracket on its pivot to thereby move the reflected images simultaneously in the same direction on the screen.

2. Apparatus for visual training such as exercising the muscles of the eyes, comprising a screen, a pair of reflectors, onto which an image is adapted to be projected to be reflected onto the screen, a framework for supporting the screen and reflectors, a reflector supporting bracket supported on a vertical pivot at its lower end on the framework, a plate pivotally mounted on a horizontal pivot on said bracket, each of said reflectors being supported on a vertically disposed pivot at their proximate ends, means for individually swinging the reflectors on their vertical pivots, means for swinging said plate on its horizontal pivot, an arm carried by said bracket, and a lever engaging said arm for swinging the bracket on its vertical pivot to thereby move the reflected images simultaneously in the same direction on said screen.

HENRY H. BRIGGS.